April 5, 1927.  1,623,629
F. P. MANSBENDEL
FUR WEIGHING MACHINE
Filed Aug. 27, 1924    4 Sheets-Sheet 1

INVENTOR
Fritz P. Mansbendel
by Robert S. Blair
ATTORNEY

April 5, 1927.

F. P. MANSBENDEL 1,623,629

FUR WEIGHING MACHINE

Filed Aug. 27, 1924   4 Sheets-Sheet 2

INVENTOR
Fritz P. Mansbendel
BY
Robert S. Blair ATTORNEY

April 5, 1927.  
F. P. MANSBENDEL  
1,623,629  
FUR WEIGHING MACHINE  
Filed Aug. 27, 1924  
4 Sheets-Sheet 4

INVENTOR  
Fritz P. Mansbendel  
BY  
Robert S. Blair  
ATTORNEY

Patented Apr. 5, 1927.

1,623,629

UNITED STATES PATENT OFFICE.

FRITZ P. MANSBENDEL, OF BROOKLYN, NEW YORK, ASSIGNOR BY MESNE ASSIGNMENTS, TO SUNFAST HATS, INCORPORATED, OF DANBURY, CONNECTICUT, A CORPORATION OF CONNECTICUT.

FUR-WEIGHING MACHINE.

Application filed August 27, 1924. Serial No. 734,372.

This invention relates to fur weighing and feeding apparatus for forming machines employed in the manufacture of felt hats.

One of the objects of the invention is to provide apparatus of the above nature practical and efficient and adapted to meet the requirements of practical use in a highly satisfactory manner. Another object is to provide apparatus of the above nature adapted to operate dependably at all times with a minimum of attention. Another object is to provide such apparatus capable of operating with the highest degree of accuracy and precision. Another object is to provide such apparatus wherein the various mechanisms are positively actuated and driven. Another object is to provide apparatus of the above nature wherein the several steps of operation are accurately and properly timed and related to each other for efficient performance. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of the various possible embodiments of this invention.

Similar reference characters refer to similar parts throughout the several views of the drawings.

Figures 1, 4, 5:
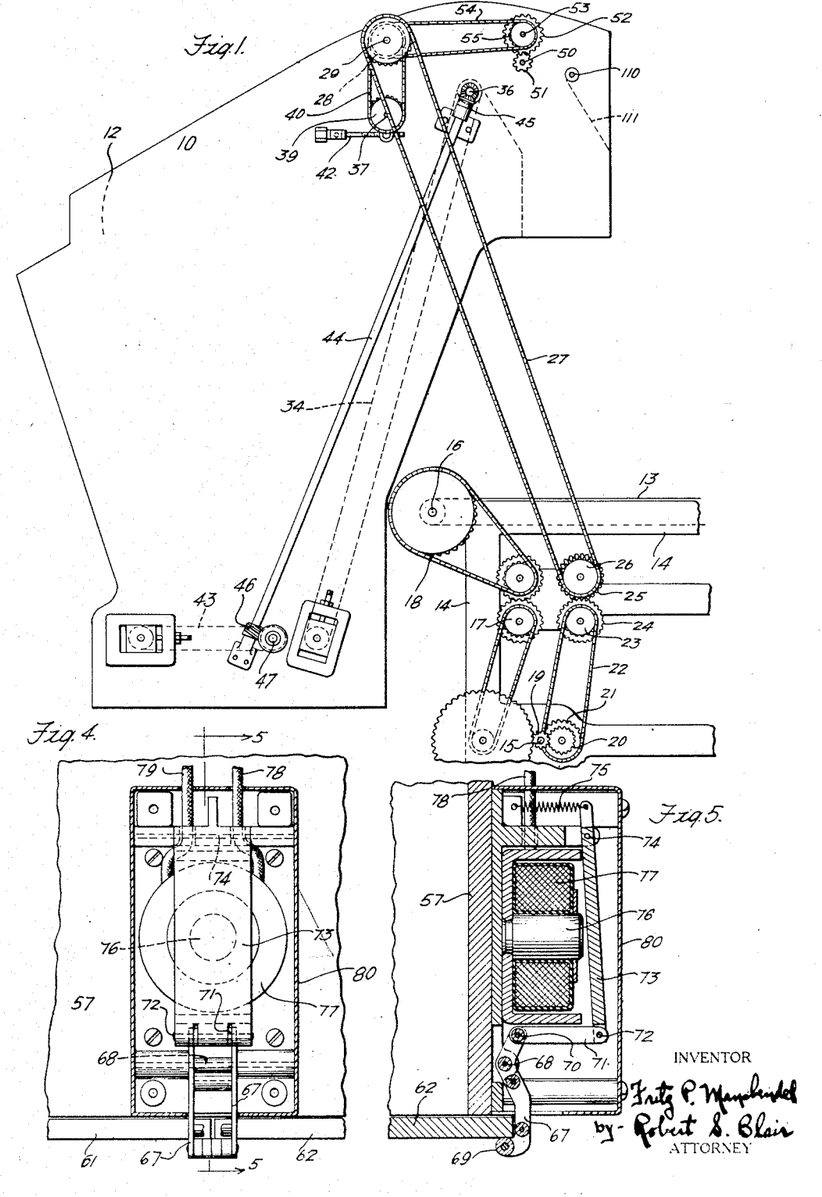
Figure 1 is a side elevation of the apparatus shown partly diagrammatically.
Figure 4 is a detail view of a releasing mechanism employed in connection with the weighing pan.
Figure 5 is a section along the line 5—5 of Fig. 4.
Figure 2:
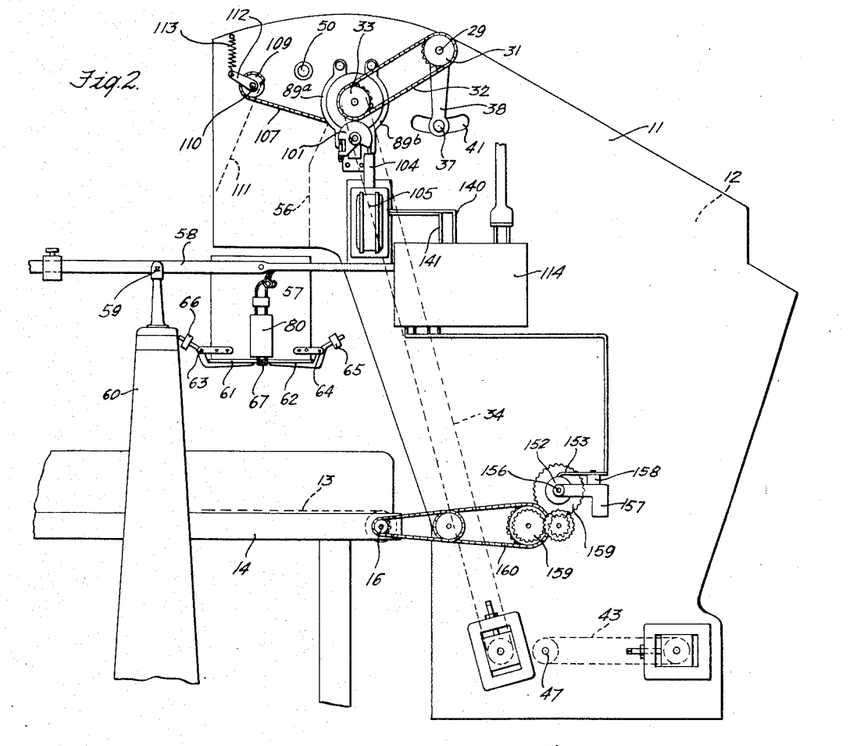
Figure 2 is a side elevation viewed from the side opposite to that shown in Fig. 1.

Referring now to Figures 1 and 2 of the drawings in detail, there is shown a frame comprising a pair of side walls 10 and 11 which are spaced from each other and with suitable end walls and cover comprise a substantially enclosed casing. The left hand portion of this casing, as viewed in Figure 1, and the right hand portion thereof, as viewed in Figure 2, forms a hopper indicated by the numeral 12 adapted to receive fur which may be introduced thereto from a suitable opening in the top. This fur is adapted to be conveyed from the hopper 12, weighed and delivered, as will be described, to the usual endless conveyor, which feeds the fur into the forming machine. This latter endless conveyor is indicated at 13 in Figures 1 and 2 and travels along a table-like frame 14 leading to the forming machine. The upper surface of the conveyor 13 travels in the direction indicated by the arrows and the fur when dropped thereon, as will be described, is conveyed thereby to the forming machine wherein the hat body is formed.

Referring to Figure 1 the apparatus is driven from a suitable source of power applied to a shaft 15 mounted on the frame 14. From this shaft 15 the driving shaft 16 of the forming machine conveyor 13 is constantly rotated through gears 19 and 19$^a$ and a chain and sprocket drive, for example, as indicated by the numerals 17 and 18. The conveyor 13 for feeding the fur into the forming machine is thus continuously driven at substantially uniform speed.

The gear 19 upon the shaft 15 through connecting gearing 20 drives a sprocket 21. The sprocket 21 through a chain 22 drives a sprocket 23 which in turn drives a gear 24. This gear 24 drives a gear 25, rotatable with which is mounted a sprocket 26. From the sprocket 26 through an upwardly extending chain 27 is driven a sprocket 28 which latter is fixed upon a rotatable shaft 29 supported in a suitable bearing sleeve extending between the two side walls 10 and 11 adjacent the top of the apparatus. This bearing sleeve for the shaft 29 is indicated at 30 in Figure 3. Referring to Figure 2, the shaft 29 projects from the side of the machine opposite to the sprocket 28 and has fixed thereon a sprocket 31. From this sprocket 31 is driven a chain 32 passing to a sprocket 33. The sprocket 33 is thus driven from the driving shaft 15 through chain 22, chain 27, shaft 29 and chain 32, and is constantly rotated thereby. From this sprocket 33 is driven an endless conveyor or feed apron 34 which is indicated by dotted lines in Figures 1 and 2 and more clearly shown in Figure 3. This drive from the constantly rotated sprocket 33 to the conveyor 34 takes place through a mechanism which will presently be described.

Figure 3:
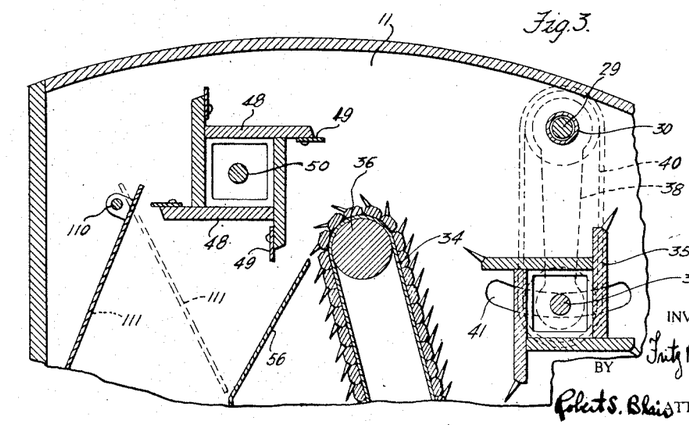
Figure 3 is a vertical longitudinal section through the upper portion of the apparatus showing certain parts in larger detail.

The feed apron or conveyor 34 preferably takes the form of an endless conveyor which extends from the top portion of the apparatus down into the hopper 12 to a point adjacent the bottom thereof. The conveyor 34 moves upwardly through the hopper 12, and is adapted to receive and convey fur upwardly from the hopper 12. It passes over an upper transverse shaft 36 through which it is driven, the shaft 36 being rotated from the sprocket 33, as will be described. The conveyor preferably takes the form of transverse slats, as shown in Figure 3, which are provided with inclined projecting teeth or pins which catch the fur and carry it upwardly over the shaft 36. A rotating wiper 35 is preferably provided adjacent to the conveyor 34 and near the top of the apparatus, and is adapted to wipe surplus fur from the conveyor and provide for a substantially uniform feed thereby. This wiper 35 is fixed on a transverse shaft 37 which is supported in swinging brackets 38 depending from the sleeve 30 about the transverse shaft 29. The shaft 37 has fixed thereon, as shown in Figure 1, a sprocket 39 which is driven by a chain 40 from the shaft 29, the wiper 35 thus being constantly rotated from the rotating shaft 29. The shaft 37 projects through arcuate slots 41 in the side walls 10 and 11 of the apparatus and may swing therein about the axis of the shaft 29 toward and away from the surface of the conveyor 34. Its position is adjustable through a suitable adjusting screw 42, shown in Figure 1. The position of the rotating wiper 35 may thus be adjusted toward and away from the conveyor 34 to determine the amount of surplus fur which is removed from the conveyor and hence the amount of the feed thereby upwardly over the shaft 36. The surplus fur removed by the wiper 35 falls back into the hopper 12.

In the bottom portion of the hopper 12 is positioned a small endless conveyor 43, the upper surface of which moves toward the lower end of the upwardly moving conveyor 34. This conveyor 43 is driven preferably by means of a shaft 44 having a beveled gear connection 45 with the shaft 36 and a worm drive 46 to the conveyor shaft 47. The conveyor 43 is thus driven when the upwardly moving conveyor 34 is driven and serves to move the fur in the hopper 12 toward the conveyor 34 and position it to be received thereby. It serves to keep the fur in the hopper 12 in a loosened condition for proper and uniform feeding.

As best shown in Figure 3, in the upper portion of the apparatus adjacent the conveyor 34 and on the side of the shaft 36 opposite the wiper 35, is a second rotating wiper 48. This wiper 48 is provided with teeth 49 which preferably take the form of serrated strips of leather, or the like, which are adapted to rub across the surface of the conveyor 34 working in between the teeth thereof and wiping the fur therefrom. The fur thus removed from the conveyor 34 by the wiper 48 falls downwardly into the weighing pan, as will be fully described hereinafter. The wiper 48 is fixed upon a transverse shaft 50 having bearings in the side walls 10 and 11. As shown in Figure 1, there is fixed upon the shaft 50 a gear 51, which meshes with a gear 52 rotatably mounted upon a stud shaft 53. The gear 52 is driven from a sprocket on the shaft 29 through a chain 54 and sprocket 55. The wiper 48 is thus constantly rotated to rub across the surface of the conveyor 34 and remove the fur therefrom as the conveyor moves by the wiper.

The fur removed from the conveyor 34 by the wiper 48 is guided downwardly by a wall 56 and falls into a weighing pan 57. This weighing pan 57 is carried upon a scale beam 58 which is finely pivoted as by suitable knife edge 59 upon a standard 60. The bottom of the weighing pan 57 preferably comprises two hinged halves 61 and 62 pivoted at 63 and 64, respectively. These bottoms are finely counter-weighted by adjustable counter-weights 65 and 66, so that they are adapted when released to swing open due to the weight of fur thereon and are closed by the counter-weights when the fur has emptied therefrom. They are held in closed position, as shown in the drawings, by a common central latch member 67.

Referring to Figures 4 and 5, the above-described latch and releasing mechanism therefor of the weighing pan are shown in detail. The latch 67 preferably comprises a lever pivoted at 68 and having at its lower end a roller 69 which passes beneath the edges of the bottoms 61 and 62 to hold the latter up against the weight of fur thereon.

Connected to the lever 67 at 70 is an arm 71 to which is connected at 72 an armature 73 pivoted at 74 and held in the position shown in the drawing by a spring 75. The armature 73 is adapted to be attracted by the core 76 of an electro-magnet coil 77 when the latter is energized. It will be seen that the spring 75 normally serves to hold the latch 67 in position of engagement and that when the coil 77 is energized the pan bottoms 61 and 62 are released. The conductors for the coil 77 are shown at 78 and 79, respectively. This releasing apparatus is mounted upon the side of the weighing pan 57 and preferably enclosed in a suitable casing 80. The weighing pan 57 is positioned over the conveyor 13 which leads to the forming machine, and thus upon energization of the coil 77 the fur in the weighing pan is dropped to the conveyor 13 and fed thereby into the forming machine.

Figure 6:
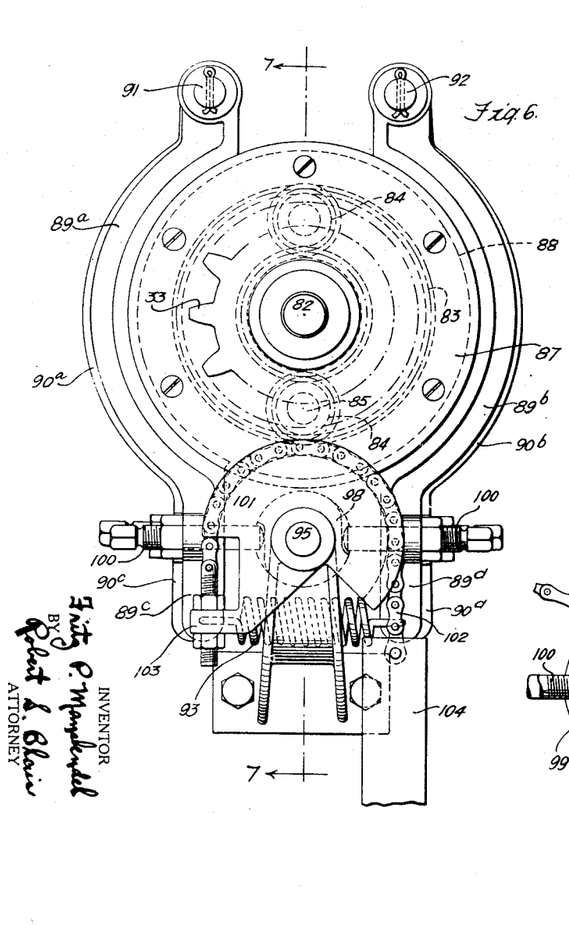
Figure 6 is an elevation of a mechanism shown in the upper portion of Fig. 2.
Figures 7, 8:
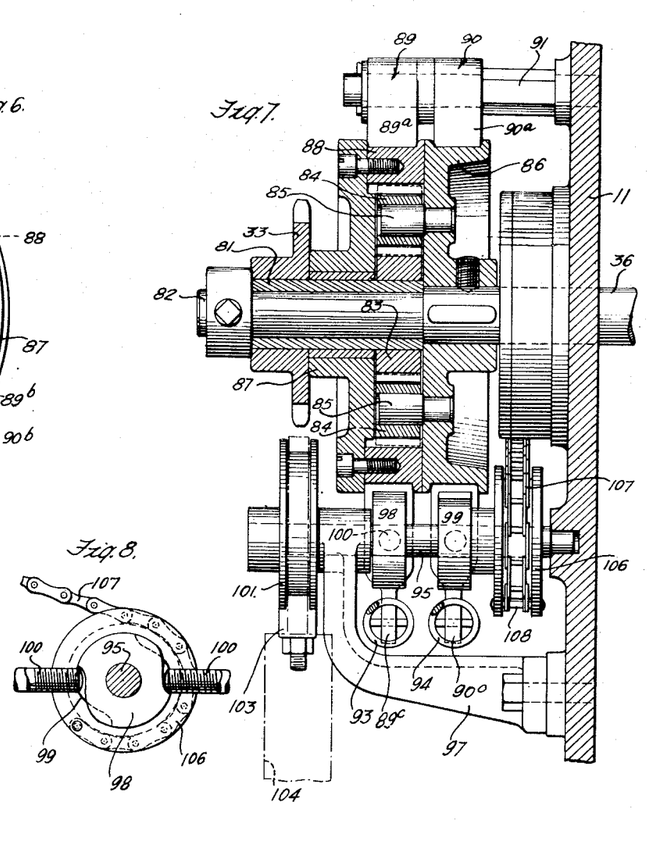
Figure 7 is a section along the line 7—7 of Fig. 6.
Figure 8 is a detail of a cam mechanism shown in Figs. 6 and 7.

Considering now again the drive of the upwardly traveling conveyor 34, turning to Figures 6 and 7, there are shown the constantly rotated sprocket 33 and the conveyor driving shaft 36 which is adapted to be driven therefrom. The sprocket 33 is fixed upon a sleeve 81, which sleeve is rotatably supported on an extension 82 of the shaft 36. Fixed upon this sleeve 81 is a gear 83 with which mesh a plurality of small gears 84, for example four in number, which are spaced about the sleeve 81. These gears 84 are rotatably mounted upon stud shafts 85 secured in the face of a disk-like member 86. The disk 86 is tightly secured upon the conveyor driving shaft 36 and upon rotation is adapted to drive the conveyor. Loosely mounted exterior of the sleeve 81 is the hub 87 of an internal gear 88, with which the four small gears 84 are in mesh. The internal gear 88 may thus rotate freely without imparting drive to the conveyor 34.

The outer periphery of the disk-like member 86 and the outer periphery of the internal gear 88, respectively, serve as brake drums. Coacting with these brake drums are brake bands, which are each preferably formed in two halves, the brake band 89 about the internal gear 88 comprising the two halves 89$^a$ and 89$^b$, and the brake band 90 for the disk 86 comprising two similar halves, and between these two halves of the respective brake drums the internal gear 89 and the disk 86 are adapted to be gripped and thereby held against rotation. At their upper ends these brake band sections are pivoted upon suitable pins 91 and 92 projecting from the wall 11, and at their lower ends they are provided, respectively, with depending portions 89$^c$, 90$^c$, 89$^d$ and 90$^d$. The two halves 89$^a$ and 89$^b$ of the brake band 89, are continually urged toward gripping engagement with the internal gear 88, by means of a tension spring 93 interposed between the two depending end portions 89$^c$ and 89$^d$. The two halves 90$^a$ and 90$^b$ of the brake band 90, are continually urged toward gripping engagement with the disk 86, by means of a tension spring 94 interposed between the two depending end portions 90$^c$ and 90$^d$.

The mechanism just described provides means through which the conveyor shaft 36 is adapted to be driven when desired from the constantly rotated sprocket 33. This mechanism, as illustrated and described, comprises an epicyclic or differential gear drive and, it will be seen, the gearing effects a reduction in speed from the sprocket 33 to the shaft 36. When the brake band 89 is in gripping position holding the internal gear 88 against rotation, and the brake band 90 is loose permitting rotation of the disk 86, the latter is rotated from the sleeve 81 through the gears 84 and the conveyor shaft 36 is rotated. When the brake band 89 is loose permitting rotation of the internal gear 88, and the brake band 90 is in gripping position preventing rotation of the disk 86, the conveyor shaft 36 is held stationary, and moreover the conveyor shaft is positively locked against further movement in either direction. Thus, the conveyor shaft 36 may be rotated from the constantly rotated sprocket 33 and its movement may be stopped and started as desired by manipulation of the brake bands 89 and 90. Moreover, as this is accomplished, the gears through which the drive occurs remain constantly in mesh.

Extending between the parts 89$^c$ and 89$^d$ and between the parts 90$^c$ and 90$^d$ of the brake bands, is a shaft 95 which has a bearing at 96 in the frame wall 11 and an outer bearing in a bracket 97 secured to the wall 11 and projecting therefrom. This shaft 95 carries two cams 98 and 99, the cam 98 being positioned between the two opposing parts 89$^c$ and 89$^d$ of the brake band 89, and the cam 99 being positioned between the two opposing parts 90$^c$ and 90$^d$ of the brake band 90. Each of these depending brake band parts 89$^c$, 89$^d$, 90$^c$ and 90$^d$ is provided with an adjustable set screw 100 threaded therethrough and adapted to coact with the respective cams 98 and 99 as followers. In the angular position of the shaft 96 shown in the drawings, the cam 99 is in engagement with the set screws 100 of the brake band 90 forcing the two halves thereof apart against the action of the spring 94 and holding the brake band out of gripping engagement with the disk 86; the cam 98 presents an undercut portion to the set screws 100 on the brake band 89 so that the two halves of this brake band are not forced apart, and the internal gear 88 is securely gripped thereby. With the parts in this position, it will be seen that the conveyor shaft 36 is rotated from the constantly driven sprocket 33. When the shaft 95 is turned through substantially 90° the undercut portion of the cam 99 comes opposite the set screws 100 of the brake band 90 permitting this brake band to grip the drum or disk 86, and the cam 98 forces the two parts of the brake band 89 out of gripping engagement with the internal gear 88. With the parts in this latter position, the conveyor shaft 36 is locked against rotation, and the internal gear 88 is loosely rotated by the sprocket 33. Thus, by turning the shaft 95 through substantially 90° from its position shown in the drawing, the conveyor 34 is stopped and locked against movement; thereafter by turning the shaft 95 back again the conveyor is re-started.

Fixed upon the cam shaft 95 exterior of the bracket 97, is a disk-like member over which passes a chain 102. The chain 102 is, at its left-hand end, as viewed in Figure 6, secured to a projecting lug 103 of the disk 101, and at its opposite end, on the other side of the disk, is connected to the movable core 104 of an electromagnetic winding 105 (shown in Fig. 2). Fixed upon the cam shaft 95, adjacent its inner end, is a disk or wheel 106 over which passes a chain 107 secured thereto, as at 108 (see Fig. 7). This chain 107 (as shown in Fig. 2) passes over and is secured to a disk or wheel 109, which is fixed upon a transverse shaft 110 extending between the two side walls 10 and 11 of the apparatus and having bearings therein. This shaft 110, as best shown in Figure 3, carries a vane or deflector 111, which is adapted when swung by the chain 107 to swing from the full line position, shown in Figure 3, to the dotted line position. In this latter position, the deflector 111 is adapted to catch any fur which may fall from the conveyor 34 or from the wiper 48, and prevent its passing downwardly into the weighing pan 57. Referring again to Figure 2, fixed upon the shaft 110 is an arm 112 which is pulled upwardly by a tension spring 113. The spring 113, it will be seen, acting through the chain 107 and its connection with the cam shaft 95, opposes the downward movement of the magnet core and normally holds the parts in the position shown in the drawings.

As has been described, the positions shown in the drawings of the parts just described are such that the conveyor shaft 36 is being driven and fur is being carried upwardly thereby and thrown by the wiper 48 downwardly into the weighing pan 57. When the electromagnet winding 105 is energized, the core 104 is quickly drawn downwardly against the action of the spring 113, thereby turning the cam shaft 95 through substantially 90°. This immediately stops the conveyor and locks it against further movement. This turning of the cam shaft 95 through the chain 107 also swings the deflector 111 into position to wholly cut off further dropping of fur into the weighing pan 57. Immediately that the electromagnet winding 105 is de-energized, the pull of the core upon the spring 113 ceases and the parts return to the positions shown in the drawings, re-establishing the drive of the conveyor 34 and swinging the deflector 111 back again. Thus, by energizing and de-energizing the electromagnet 105 the parts are positively actuated to cut off and re-establish the feed of the fur to the weighing pan 57.

Figure 9:
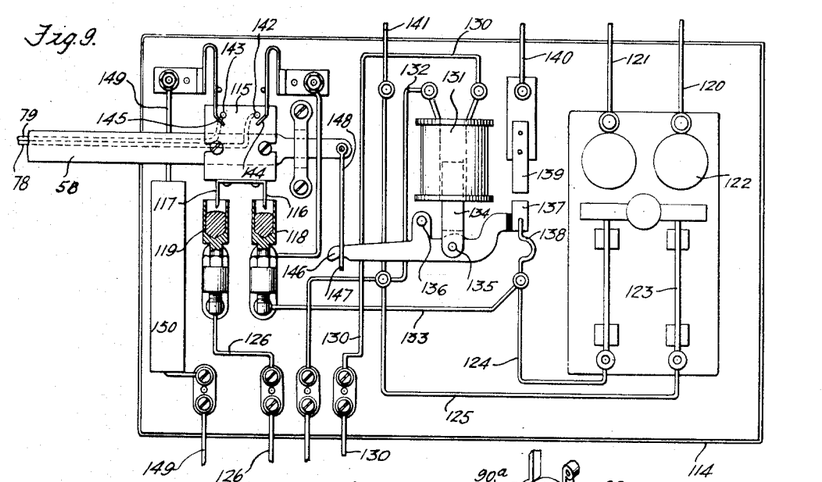
Figure 9 is a plan of a switch mechanism controlled by the weighing pan.

Referring again to Figure 2, the right-hand end of the scale beam 58 is seen to enter a casing 114 mounted upon the outer surface of the side wall 11 adjacent to the electromagnet 105. Referring to Figure 9, there is mounted upon the scale beam 58, adjacent its end and within the casing 114, an insulating block 115. Secured to the lower surface of the block 115 is a U-shaped conductor comprising a pair of depending contact points 116 and 117. When the scale beam 58 falls, due to the weight of fur fed into the weighing pan 57, the contacts 116 and 117 enter mercury contained in a pair of cups 118 and 119 positioned beneath the respective contact points. Entering the casing 114 are a pair of line wires 120 and 121 from a suitable source of electrical energy, these wires passing through fuses 122 to a suitable knife switch 123 from the two sides of which extend conductors 124 and 125. The mercury cup 119 is connected through a conductor 126 to a brush or wiper 127 engaging the periphery of a rotating timing drum 128 (shown in Fig. 10), which will be later described in detail. A second brush or wiper 129 also engages the periphery of the drum 128 and is connected by a conductor 130 with the coil of an electromagnet 131. A conductor 132 connects the other side of the winding 131 with the main feed wire 125. The other mercury cup 118 is connected by a conductor 133 with the other side 124 of the line. Thus, when the scale beam 58 drops, as described, and the contacts 116 and 117 enter the mercury cups, a circuit is completed through the winding of the electromagnet 131.

The core 134 of this electromagnet 131 is pivotally connected at its lower end 134* to a lever 135 pivoted at 136. At the right-hand end of the lever 135 is a contact member 137 which is connected by a flexible conductor 138 with the main feed wire 124. Above the contact 137 is a stationary contact 139 which is connected through a conductor 140 with one side of the winding of the electromagnet 105. (Fig. 2). The other side of this winding is connected by a conductor 141 with the other side 125 of the main feed line. As soon as the electromagnet 131 is energized by contact at the mercury cups, as has been described, the lever 135 is swung upwardly thereby about its pivot, and contact is made between the contacts 137 and 139, thereby completing the circuit through the electromagnet 105. This energizing of the electromagnet 105 draws in the core 104 thereof and interrupts the feed of the fur to the weighing pan 57. Thus, immediately upon the falling of the scale beam, due to a predetermined weight of fur having fallen into the weighing pan, the drive of the conveyor 34 is interrupted, the conveyor is locked against further movement, and the deflector 111 is swung to operative position.

Considering now the electromagnet 77 which, as has been described, is adapted to release the bottom of the weighing pan 57 and permit the fur to fall therefrom, the two conductors 78 and 79 connected thereto extend along the scale beam 58 (Fig. 9) to a pair of contacts 142 and 143, respectively, which are positioned upon the insulating block. Adjacent to these contacts are a pair of spring contacts 144 and 145, respectively. The left-hand end of the lever 135 is provided with a hooked portion 146 which passes through a stirrup 147 suspended by a rod 148 from the right-hand end of the scale beam 58. When the lever 135 is drawn upwardly by the electromagnet 131, the end 146 thereof moves downwardly and through the stirrup 147, and the rod 148, draws the scale beam downwardly so that contact is made between the contacts 143 and 145, and between the contacts 142 and 144. The contact 145 is connected by a conductor 149 through a suitable resistance 150 with a brush or wiper 151 engaging the periphery of a rotating timing drum 152. A second wiper 153 also engaging the periphery of the drum 152 is connected by a conductor 154 with the line wire 125. The spring contact member 144 is connected by conductors 155 and 133 with the other side 124 of the line. The contact having been made at the contacts 142, 143, 144 and 145 by dropping of the scale beam 58 and actuation of the lever 135, as above described, thereafter immediately upon electrical connection being made between the two wipers 151 and 153 a circuit is completed through the electromagnet 77 of the weighing pan release.

Figure 10:
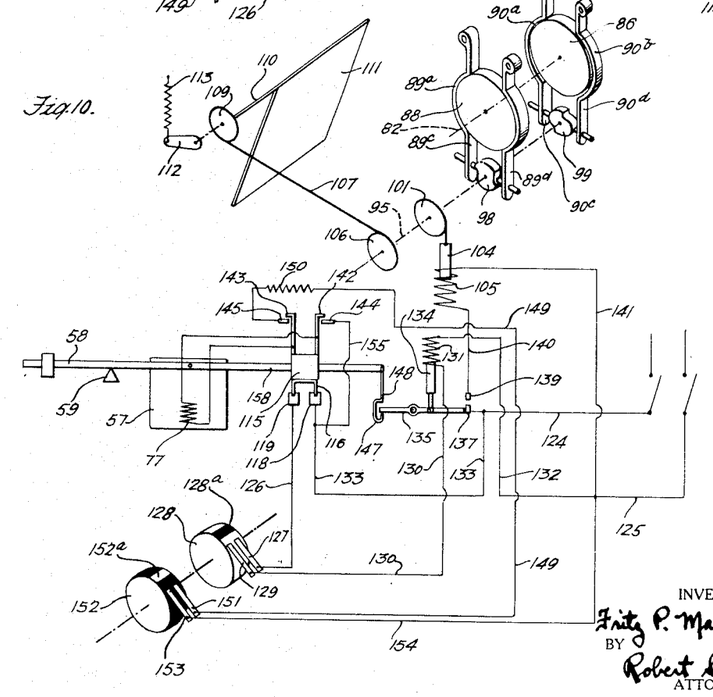
Figure 10 is a diagrammatic representation of the electric circuits employed in conjunction with certain other parts of the apparatus.

Considering now more particularly the two timing drums 128 and 152, reference is had first to Figure 2. The two drums are mounted upon a shaft 156 which has bearings in a bracket 157 secured to the wall 11 of the apparatus. The brushes or wipers 127, 129, 151 and 153 are mounted upon an insulating block 158 on the bracket 157 and bear against the peripheries of their respective drums, as shown in Figure 10. The shaft 156 carrying the timing drums 128 and 152 is rotated at constant speed through suitable gearing 159 and chain drive 160 from the shaft 16, which drives the endless conveyor 13 leading to the forming machine.

Referring again to Figure 10, the periphery of the timing drum 152 has its major portion of insulating material, a small metallic strip 152$^a$ being adapted to engage and make electrical connection between the wipers 151 and 153 at a predetermined time in the rotation of the drum. When the scale beam 58 falls, due to the weight of fur thereon, the wipers 151 and 153 are in contact with the insulating portion of the drum 152. Thereafter, when the metal surface 152$^a$ passes over the wipers 151 and 153 the circuit is completed through the electromagnet 77 on the weighing pan 57, and the latch 67 is thereby released permitting the fur to fall from the weighing pan onto the conveyor 13 to be fed to the forming machine. The drum 152 is constantly rotated so that this delivery of a predetermined weight of fur to the conveyor 13 occurs at predetermined equally spaced intervals of time which may be altered by altering the speed of rotation of the drum. Moreover, since the drum 152 is driven from the conveyor 13 the intermittent feed of the fur to the conveyor is in synchronism with the movement thereof. As soon as the fur has been released from the weighing pan the insulating portion of the drum 152 again moves beneath the contacts 151 and 153, and the circuit of the electromagnet 77 is again broken permitting the spring 75 (Fig. 5) to draw the armature 73 and the parts connected thereto back to normal position. The bottoms 61 and 62 of the weighing pan swing upwardly by their counterweights before the magnet 77 is deenergized and thereupon, being again caught by the latch 67, are in position to receive the next load of fur.

The timing drum 128 has a periphery substantially all metallic so that during the major portion of its rotation contact is made between the two wipers 127 and 129. These wipers are in engagement with the metallic portion of the drum when the scale beam 58 drops, as above described, so that the circuit is immediately completed through the electromagnet 131. A small portion of the periphery of the timing drum 128 comprises an insulating strip 128$^a$. When this insulating portion rotates beneath the wipers 127 and 129 the electrical connection therebetween is broken and the circuit through the electromagnet 131 is broken. Thereupon the lever 135 is permitted to drop, the contacts 139 and 137 are separated, and the circuit through the electromagnet 105 is broken. This deenergization of the electromagnet 105 causes re-starting of the conveyor 34 and swinging of the deflector 111 back to inoperative position, all as has been described above. At the same time, the fur having been delivered from the weighing pan 57, and the pull of the lever 135 released, the scale beam 58 rises and the contacts 116 and 117 move out of the mercury cups 118 and 119. The parts are thus restored to their original positions, the feed of the fur from the hopper 12 to the weighing pan 57 is re-started and the cycle is repeated.

The timing drums 152 and 128 are so adjusted on the shaft 156 that a sufficient interval of time is allowed between the discharge of the fur from the weighing pan, which is determined by the movement of the metallic part 152ª beneath the contacts 151 and 153, and the re-starting of the delivery of fur to the weighing pan, which is determined by movement of the insulating strip 128ª beneath the contacts 127 and 129, to permit the botttoms of the weighing pan to resume their closed position ready to receive the next load of fur. The interval between the start of the feed to the weighing pan by the insulating piece 128 coming beneath the contacts 127 and 129, and the release of the pan bottoms to discharge the fur therefrom, is sufficient to permit the accumulation upon the weighing pan of any of the various weights of fur which it may be desired to feed to the forming machine to make a hat. Thus, the operator need simply adjust the weight upon the graduated scale beam 58 to the weight of fur to be weighted out for each hat, before the operation of the apparatus is started. It will be seen that the various mechanisms of the apparatus are positively operated in a manner which insures dependable operation at all times. The scale beam is substantially free, the piercing of the mercury in the cups 118 and 119 by the pointed contacts 116 and 117 offering little or no resistance. The relay mechanism comprising the electromagnet 131 and connections is particularly advantageous since it makes possible the use of the mercury contact without necessitating the passage of a heavy current therethrough.

As many possible embodiments may be made of the above invention and as many changes might be made in the embodiments above set forth, it is to be understood that all matter hereinbefore set forth is to be interpreted as illustrative and not in a limiting sense.

I claim as my invention:

1. In fur weighing and feeding apparatus for hat forming machines, in combination, a conveyor for fur, a weighing pan adapted to receive said fur from said conveyor, means adapted to drive said conveyor, means adapted upon movement of said weighing pan due to the weight of said fur thereon to interrupt said drive and lock said conveyor against further movement, and electrical means adapted at predetermined intervals of time to release said lock and re-establish said drive.

2. In fur weighing and feeding apparatus for hat forming machines, in combination, a conveyor for fur, means adapted to drive said conveyor, a weighing pan adapted to receive said fur from said conveyor, means adapted upon movement of said weighing pan due to the weight of fur thereon to interrupt said drive of said conveyor and lock said conveyor against further movement, means adapted to feed fur to the forming machine, means adapted at predetermined intervals of time to deliver said fur from said weighing pan to said feeding means, and electrical means adapted at predetermined intervals of time to release said lock on said conveyor and re-establish said drive thereof.

3. In fur weighing and feeding apparatus for hat forming machines, in combination, a conveyor for fur, means adapted to drive said conveyor, a weighing pan adapted to receive said fur from said conveyor, and electromagnetic means adapted upon movement of said weighing pan due to the weight of fur thereon to interrupt said drive and lock said conveyor against further movement.

4. In fur weighing and feeding apparatus for hat forming machines, in combination, a conveyor for fur, a weighing pan adapted to receive said fur from said conveyor, a driving mechanism through which said conveyor is adapted to be driven, a movable cam controlling said driving mechanism, and means adapted upon movement of said weighing pan due to the weight of said fur thereon to move said cam to affect said driving mechanism so as to interrupt said conveyor drive.

5. In fur weighing and feeding apparatus for hat forming machines, in combination, a conveyor for fur, a weighing pan adapted to receive said fur from said conveyor, a driving mechanism through which said conveyor is adapted to be driven, a movable cam controlling said driving mechanism, and electromagnetic means adapted upon movement of said weighing pan due to the weight of said fur thereon to move said cam to affect said driving mechanism so as to interrupt said conveyor drive.

6. In fur weighing and feeding apparatus for hat forming machines, in combination, a conveyor for fur, a weighing pan adapted to receive said fur from said conveyor, a driving mechanism through which said conveyor is driven, a cam adapted upon rotation to affect said driving mechanism to interrupt said drive, a second cam adapted upon rotation to affect said clutch mechanism to re-establish said drive, means adapted upon movement of said weighing pan due to the weight of said fur thereon to rotate said first cam to interrupt said drive of said conveyor, and means adapted at predetermined intervals of time to rotate said second cam to re-establish said drive of said conveyor.

7. In fur weighing and feeding apparatus for hat forming machines, in combination, a conveyor for fur, a weighing pan adapted to receive said fur from said conveyor, a driving mechanism through which said conveyor is driven, a rotatable shaft, means on said shaft adapted upon rotation thereof in one direction to affect said driving mechanism to interrupt said drive of said conveyor, means on said shaft adapted upon rotation thereof in the opposite direction to affect said driving mechanism to re-establish said drive, means adapted upon movement of said weighing pan due to the weight of fur thereon to rotate said shaft in said first direction, and means adapted at predetermined intervals of time to rotate said shaft in the opposite direction.

8. In fur weighing and feeding apparatus for hat forming machines, in combination, a conveyor for fur, a weighing pan adapted to receive said fur from said conveyor, a driving mechanism through which said conveyor is driven, a rotatable shaft, means on said shaft adapted upon rotation thereof in one direction to affect said driving mechanism to interrupt said drive of said conveyor, means on said shaft adapted upon rotation thereof in the opposite direction to affect said driving mechanism to re-establish said drive, electromagnetic means adapted upon movement of said weighing pan due to the weight of fur thereon to rotate said shaft in said first direction, a spring acting in opposition to said last means, and means adapted at predetermined intervals of time to release said electromagnetic means and permit said spring to rotate said shaft in the opposite direction to re-establish said drive of said conveyor.

9. In fur weighing and feeding apparatus for hat forming machines, in combination, a conveyor for fur, a weighing pan adapted to receive said fur from said conveyor, means adapted to receive said fur from said weighing pan and feed the same to the forming machine, means controlled by movement of said weighing pan due to the weight of said fur thereon adapted intermittently to deliver said fur therefrom to said feeding means, a driving mechanism through which said conveyor is driven, a rotatable shaft, means upon said shaft adapted upon rotation thereof in one direction to affect said driving mechanism to interrupt said drive and upon rotation thereof in the opposite direction to re-establish said drive, means adapted upon said movement of said weighing pan due to the weight of said fur thereon to rotate said shaft in said first direction, and means adapted at predetermined intervals of time to rotate said shaft in said opposite direction.

10. In fur weighing and feeding apparatus for hat forming machines, in combination, a conveyor for fur, a weighing pan adapted to receive said fur from said conveyor, a mechanism through which said conveyor is driven, including a pair of friction devices one of which is adapted upon frictional engagement to lock said conveyor against movement, and the other of which is adapted upon frictional engagement to establish the drive of said conveyor, means adapted upon movement of said weighing pan due to the weight of said fur thereon to effect frictional engagement of said first frictional device, and means adapted at predetermined intervals of time to effect frictional engagement of said second frictional device.

11. In fur weighing and feeding apparatus for hat forming machines, in combination, a conveyor for fur, a weighing pan adapted to receive said fur from said conveyor, a differential gear mechanism through which said conveyor is driven, and means adapted upon movement of said weighing pan due to the weight of said fur thereon to affect said differential gear mechanism to interrupt the drive of said conveyor.

12. In fur weighing and feeding apparatus for hat forming machines, in combination, a conveyor for fur, a weighing pan adapted to receive said fur from said conveyor, a differential gear mechanism through which said conveyor is driven, means adapted upon movement of said weighing pan due to the weight of said fur thereon to affect said differential gear mechanism to interrupt the drive of said conveyor, and means adapted at predetermined intervals of time to affect said differential gear mechanism to re-establish said drive.

13. In fur weighing and feeding apparatus for hat forming machines, in combination, a conveyor for fur, a mechanism through which said conveyor is driven comprising a constantly rotated gear, a brake drum connected in driving relation with said conveyor, a loosely mounted brake drum, differential gearing adapted to drive either of said drums from said constantly rotated gear and clamping means for each of said drums, and means for separately releasing said two clamping means to operate said mechanism to alternately interrupt and establish the drive of said conveyor.

14. In fur weighing and feeding apparatus for hat forming machines, in combination, a conveyor for fur, a mechanism through which said conveyor is driven comprising a constantly rotated gear, a brake drum connected in driving relation with said conveyor, a loosely mounted brake drum, differential gearing adapted to drive either of said drums from said constantly rotated gear and clamping means for each of said drums, and means comprising a pair of rotatable cams for separately releasing said two clamping means to operate said mechanism to alternately interrupt and establish the drive of said conveyor.

15. In fur weighing and feeding apparatus for hat forming machines, in combination, a conveyor for fur, a mechanism through which said conveyor is driven including a rotatable drum connected to said conveyor, clamping means therefor, a second and loosely mounted rotatable drum, clamping means therefor, and means adapted upon clamping of said first drum and release of said second drum to disengage the drive of said conveyor and adapted upon clamping of said second drum and release of said first drum to establish the drive of said conveyor, and means for separately operating said two clamping means to operate said mechanism.

16. In fur weighing and feeding apparatus for hat forming machines, in combination, a conveyor for fur, a mechanism through which said conveyor is driven including a rotatable drum connected to said conveyor, a clamping means therefor, a second and loosely mounted rotatable drum, clamping means therefor, and means adapted upon clamping of said first drum and release of said second drum to disengage the drive of said conveyor and adapted upon clamping of said second drum and release of said first drum to establish the drive of said conveyor, a rotatable shaft, and a pair of cams thereon adapted upon rotation thereof to separately render ineffective said two clamping means to operate said mechanism.

17. In fur weighing and feeding apparatus for hat forming machines, in combination, a conveyor for fur, a weighing pan adapted to receive said fur from said conveyor, a mechanism through which said conveyor is driven including a rotatable drum connected to said conveyor, clamping means therefor, a second and loosely mounted rotatable drum, clamping means therefor, and means adapted upon clamping of said first drum and release of said second drum to disengage the drive of said conveyor and adapted upon clamping of said second drum and release of said first drum to establish the drive of said conveyor, means adapted upon movement of said weighing pan due to the weight of said fur thereon to affect said clamping means to disengage said drive of said conveyor, and means adapted at predetermined intervals of time to affect said clamping means to establish said drive of said conveyor.

18. In fur weighing and feeding apparatus for hat forming machines, in combination, a conveyor for fur, a weighing pan adapted to receive said fur from said conveyor, a deflector movable into and out of the path of said fur from said conveyor to said weighing pan, a driving mechanism through which said conveyor is driven, and common means adapted upon movement of said weighing pan due to the weight of said fur thereon to affect said driving mechanism to interrupt the drive of said conveyor and to move said deflector into the path of said fur from said conveyor to said weighing pan.

19. In fur weighing and feeding apparatus for hat forming machines, in combination, a weighing pan, means for conveying fur thereto, a deflector movable into and out of the path of said fur to said weighing pan, and electromagnetic means adapted upon movement of said weighing pan due to the weight of said fur thereon to positively move said deflector into the path of said fur to said weighing pan.

20. In fur weighing and feeding apparatus for hat forming machines, in combination, a weighing pan, means adapted to feed fur into said weighing pan, electromagnetic means adapted to interrupt the feed of said fur to said weighing pan, an electric circuit for said electromagnetic means, a mercury contact adapted upon falling of said weighing pan to complete said electric circuit to actuate said electromagnetic means, and timing means adapted at predetermined intervals of time to break said circuit.

21. In fur weighing and feeding apparatus for hat forming machines, in combination, a weighing pan, means adapted to feed fur thereinto, an electric circuit, an electromagnet in said circuit, means adapted upon energization of said electromagnet to interrupt the feed of said fur to said weighing pan, a second electric circuit, means adapted upon falling of said weighing pan to close said second circuit, a relay switch controlled by said second circuit adapted to complete said first circuit to energize said electromagnet, and timing means adapted at predetermined intervals of time to break said first circuit.

22. In fur weighing and feeding apparatus for hat forming machines, in combination, a weighing pan, means adapted to feed fur thereinto, an electric circuit, an electromagnet in said circuit, means adapted upon energization of said electromagnet to be actuated thereby to interrupt the feed of said fur to said weighing pan, a second electric circuit, a mercury contact adapted upon falling of said weighing pan to close said second circuit, a relay switch controlled by said second circuit adapted to close said first circuit to energize said electromagnet, and timing means adapted at predetermined intervals of time to break said first circuit.

23. In fur weighing and feeding apparatus for hat forming machines, in combination, a weighing pan, means adapted to feed fur thereinto, an electromagnet, means adapted to be actuated by said electromagnet to discharge said fur from said weighing pan, a circuit for said electromagnet, a switch in said circuit controlled by movement of said weighing pan, and means actuated by falling of said weighing pan due to the weight of fur thereon adapted to further positively move said weighing pan to close said switch.

24. In fur weighing and feeding apparatus for hat forming machines, in combination, a weighing pan, means adapted to feed fur thereinto, an electromagnet, means adapted to be actuated by said electromagnet to discharge said fur from said weighing pan, a circuit for said electromagnet, a switch in said circuit adapted to be closed by falling of said weighing pan, a second switch in said circuit, and timing means adapted subsequently to the falling of said weighing pan to close said second switch to energize said electromagnet.

25. In fur weighing and feeding apparatus for hat forming machines, in combination, a weighing pan, means adapted to feed fur thereinto, an electromagnet, means adapted to be actuated by said electromagnet to discharge said fur from said weighing pan, a circuit for said electromagnet, a switch in said circuit adapted to be closed by falling of said weighing pan, a pair of spaced contacts in said circuit, a constantly rotating timing drum normally insulating said spaced contacts from one another, and means on said timing drum adapted subsequently to the falling of said weighing pan to form electrical connection between said contacts to complete said circuit and energize said electromagnet.

26. In fur weighing and feeding apparatus for hat forming machines, in combination, a weighing pan, means adapted to feed fur thereinto, an electric circuit, an electromagnet in said circuit, means adapted upon energization of said electromagnet to interrupt the feed of said fur to said weighing pan, means adapted upon de-energization of said electromagnet to re-establish said feed, means adapted upon falling of said weighing pan due to the weight of fur thereon to close said electric circuit to energize said electromagnet, and constantly driven timing means adapted at predetermined intervals of time to break said circuit and de-energize said electromagnet.

27. In fur weighing and feeding apparatus for hat forming machines, in combination, a weighing pan, means adapted to feed fur thereinto, an electric circuit, an electromagnet in said circuit, means adapted upon energization of said electromagnet to interrupt the feed of said fur to said weighing pan, means adapted upon de-energization of said electromagnet to re-establish said feed, a pair of spaced contacts in said circuit, a constantly rotating timing drum normally forming electrical connection between said contacts, a switch in said circuit, means adapted upon falling of said weighing pan due to the weight of fur therein to close said switch to energize said electromagnet, and means on said timing drum adapted at predetermined intervals of time to break the electrical connection between said spaced contacts to break said circuit and de-energize said electromagnet.

28. In fur weighing and feeding apparatus for hat forming machines, in combination, a weighing pan, means adapted to feed fur thereinto, an electromagnet, means adapted upon energization of said electromagnet to interrupt the feed of said fur to said weighing pan, means adapted upon de-energization of said electromagnet to re-establish said feed, a circuit for said electromagnet, means adapted upon falling of said weighing pan due to the weight of fur thereon to close said circuit and energize said electromagnet, means adapted at predetermined intervals of time to break said circuit and de-energize said electromagnet, and means adapted positively to hold said weighing pan down during the interval between said falling thereof and said breaking of said circuit.

29. In fur weighing and feeding apparatus for hat forming machines, in combination, a weighing pan, means adapted to feed fur thereinto, an electromagnet, means adapted upon energization of said electromagnet to interrupt the feed of said fur to said weighing pan, means adapted upon de-energization of said electromagnet to re-establish said feed, a circuit for said electromagnet, means adapted upon falling of said weighing pan due to the weight of fur thereon to close said circuit and energize said electromagnet, means adapted at predetermined intervals of time to break said circuit and de-energize said electromagnet, means adapted positively to hold said weighing pan down during the interval between said falling thereof and said breaking of said circuit, and means adapted to deliver said fur from said weighing pan during said interval of time.

30. In fur weighing and feeding apparatus for hat forming machines, in combination, a weighing pan, means adapted to feed fur thereinto, an electric circuit, a switch in said circuit adapted to be closed by falling of said weighing pan due to the weight of fur therein, and means operative upon falling of said weighing pan adapted positively to hold down said weighing pan to hold said switch closed.

31. In fur weighing and feeding apparatus for hat forming machines, in combination, a weighing pan, means adapted to feed fur thereinto, an electric circuit, a switch in said circuit adapted to be closed by falling of said weighing pan due to the weight of fur therein, means operative upon falling of said weighing pan adapted positively to hold down said weighing pan to hold said switch closed, means adapted subsequently to said falling of said weighing pan to deliver said fur therefrom, and means adapted subsequently to said delivery to release said holding means and permit said weighing pan to rise.

32. In fur weighing and feeding apparatus for hat forming machines, in combination, a weighing pan, means adapted to feed fur thereinto, an electric circuit, a switch in said circuit adapted to be closed by falling of said weighing pan due to the weight of fur therein, means operative upon falling of said weighing pan adapted positively to hold down said weighing pan to hold said switch closed, means adapted subsequently to said falling of said weighing pan to deliver said fur therefrom, means adapted subsequently to said delivery to release said holding means and permit said weighing pan to rise, and means adapted during the interval between said falling and said rising of said weighing pan to interrupt the feed of said fur to said weighing pan.

33. In fur weighing and feeding apparatus for hat forming machines, in combination, a weighing pan, means adapted to feed fur thereinto, an electromagnet adapted upon energization to interrupt said feed, means adapted upon falling of said weighing pan to energize said electromagnet, a second electromagnet adapted upon energization to open said weighing pan and deliver said fur therefrom, a switch in the circuit of said second electromagnet adapted to be closed upon falling of said weighing pan, a second switch in said last circuit, timing means adapted subsequently to the falling of said weighing pan to close said second switch and energize said second electromagnet to open said weighing pan and deliver the fur therefrom, means adapted subsequently to close said weighing pan, and means adapted subsequently to the closing of said weighing pan to reestablish said feed thereto.

34. In fur weighing and feeding apparatus for hat forming machines, in combination, a weighing pan, a hopper for fur, a toothed conveyor traveling through said hopper and adapted to convey fur therefrom to said weighing pan, a rotating wiper adapted to remove surplus fur from said conveyor and return the same to said hopper, and means for adjusting the position of said rotating wiper toward and away from said conveyor to regulate the amount of fur removed thereby.

In testimony whereof, I have signed my name to this specification this 12th day of August, 1924.

FRITZ P. MANSBENDEL.